United States Patent
Okochi et al.

(10) Patent No.: US 7,374,815 B2
(45) Date of Patent: *May 20, 2008

(54) REMOVABLE PRESSURE SENSITIVE ADHESIVE COMPOSITIONS AND SHEETS

(75) Inventors: Naoki Okochi, Ibaraki (JP); Masahiko Ando, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 30 days.

This patent is subject to a terminal disclaimer.

(21) Appl. No.: 10/157,136

(22) Filed: May 30, 2002

(65) Prior Publication Data

US 2003/0017330 A1 Jan. 23, 2003

(30) Foreign Application Priority Data

May 30, 2001 (JP) .............................. 2001-162052

(51) Int. Cl.
*B32B 27/00* (2006.01)
(52) U.S. Cl. .................... 428/423.1; 526/931; 526/320
(58) Field of Classification Search .................. 528/44, 528/52, 53, 59, 68, 75, 76, 80, 81, 82, 905, 528/54; 525/330.3; 526/931, 320; 412/901; 427/208.4; 428/423.1
See application file for complete search history.

(56) References Cited

U.S. PATENT DOCUMENTS

| | | | | |
|---|---|---|---|---|
| 3,865,770 A * | 2/1975 | Blake | .......................... | 524/187 |
| 4,145,514 A | 3/1979 | de Vry et al. | .................. | 528/75 |
| 5,240,989 A | 8/1993 | Bernard et al. | ............. | 524/560 |
| 5,433,892 A * | 7/1995 | Czech | ........................ | 252/500 |
| 5,734,002 A * | 3/1998 | Reich et al. | ................... | 528/53 |
| 5,977,284 A * | 11/1999 | Reich et al. | ................... | 528/53 |
| 6,177,540 B1 * | 1/2001 | Harlan et al. | ................ | 528/364 |
| 6,180,742 B1 * | 1/2001 | Kato et al. | ................ | 526/328.5 |
| 6,489,396 B2 * | 12/2002 | Nakamura et al. | .......... | 525/117 |
| 6,552,118 B2 * | 4/2003 | Fujita et al. | ................. | 524/588 |

FOREIGN PATENT DOCUMENTS

| | | |
|---|---|---|
| EP | 0 731 121 A2 | 9/1996 |
| EP | 0 819 713 A1 | 1/1998 |
| JP | 5-163480 | 6/1993 |
| JP | 5-169596 | 7/1993 |
| JP | 8-41433 | 2/1996 |
| JP | 8-120247 | 5/1996 |
| JP | 8-199143 | 8/1996 |
| WO | WO 98/24826 A1 | 6/1998 |
| WO | WO 00/71625 A1 | 11/2000 |

OTHER PUBLICATIONS

Copending U.S. Appl. No. 10/157,138.*
Patent Abstract of Japan, vol. 1999, No. 03, Mar. 31, 1999, (abstract only) (JP 10330722, Dec. 15, 1998).
Patent Abstract of Japan, vol. 015, No. 202 May 23, 1991 (abstract only) (JP 03054285, Mar. 8, 1991).
Database WPI, Derwent Publications Ltd., AN 2000-641575 (abstract only) (JP 2000230157, Aug. 22, 2000).

* cited by examiner

*Primary Examiner*—Thao Tran
(74) *Attorney, Agent, or Firm*—Birch, Stewart, Kolasch & Birch, LLP

(57) ABSTRACT

A removable pressure sensitive adhesive composition includes at least (A) a hydroxyl-group-containing acrylic polymer, (B) an amine compound containing plural hydroxyl groups, and (C) a polyisocyanate compound and has a gel fraction of equal to or more than 70% by weight after drying or curing. A removable pressure sensitive adhesive sheet has a removable pressure sensitive adhesive layer including the removable pressure sensitive adhesive composition formed on one or both sides of a base material. The sheet may have a 180° peel force with respect to a melamine-faced steel sheet of 5 N/20-mm or less and may have a 180° peel force after adhesion at 50° C. for 48 hours of 1.2 times or less the initial adhesion (after adhesion at 23° C. for 20 minutes), as determined at a pulling rate of 300 mm/minute, 23° C. and 50% relative humidity.

8 Claims, No Drawings

REMOVABLE PRESSURE SENSITIVE ADHESIVE COMPOSITIONS AND SHEETS

BACKGROUND OF THE INVENTION

1. Field of the Invention

The present invention relates to a removable pressure sensitive adhesive composition which mainly contains an acrylic polymer and is used in labels, pressure sensitive adhesive tapes or sheets, as well as to such a removable pressure sensitive adhesive sheet using the removable pressure sensitive adhesive composition.

2. Description of the Related Art

Removable (removing type) pressure sensitive adhesives are formed into sheets or tapes and are affixed to surfaces of adherends upon use and are peeled off and removed from the adherends after the intended purpose has been achieved. They are used as pressure sensitive adhesives in pressure sensitive adhesive sheets such as surface protecting films, masking tapes for painting and removable memo pads (e.g., sticky notes).

For example, the surface protecting films are affixed to surfaces of adherends such as a stainless steel sheets, aluminium sheets, prepainted copper sheets, and other metal sheets or plywood to thereby prevent the surfaces of the adherends from staining or damaging upon their transportation, storage or processing. The surface protecting films of this type must adhere to the adherends without peeling off upon their transportation, storage or processing and must easily be removed from the adherends when the films become unnecessary after protection of the adherends.

However, conventional pressure sensitive adhesive tapes often increase in their adhesive strength due to changes with time after adhesion to adherends, and cannot significantly be peeled off from the adherends after adhesion or may leave the pressure sensitive adhesives as deposits and thereby stain the adherends.

As is described above, conventional removable pressure sensitive adhesives become less removable with their increasing tackiness (adhesive strength) with time and thereby cannot significantly be peeled off from the adherends or stain the adherends. For example, the pressure sensitive adhesives may cause adhesive deposits on the adherends. Demands have therefore been made to solve these problems.

SUMMARY OF THE INVENTION

Accordingly, an object of the present invention is to provide a removable pressure sensitive adhesive composition and a removable pressure sensitive adhesive sheet that exhibit such tackiness as not to be peeled off from an adherend during adhesion to the adherend and can easily be removed from the adherend without staining the adherend.

Another object of the present invention is to provide a removable pressure sensitive adhesive composition and a removable pressure sensitive adhesive sheet which can exhibit sufficient cohesion after short-time aging and have satisfactory productivity.

After intensive investigations to achieve the above objects, the present inventors have found that a pressure sensitive adhesive which includes an acrylic polymer containing a hydroxyl group as an pressure sensitive adhesive in combination with a specific curing agent and a specific curing aid and exhibits a specific gel fraction after drying or curing is useful. Specifically, this pressure sensitive adhesive exhibits such tackiness as not to be peeled off from an adherend during adhesion to the adherend, is substantially prevented from increasing in tackiness with time and can easily be peeled off from the adherend after adhesion without staining the adherend. The present invention has been accomplished based on these findings.

Specifically, the present invention provides, in one aspect, a removable pressure sensitive adhesive composition including at least (A) a hydroxyl-group-containing acrylic polymer, (B) an amine compound containing plural hydroxyl groups, and (C) a polyisocyanate compound, in which a dried or cured product of the composition has a gel fraction of equal to or more than 70% by weight.

The removable pressure sensitive adhesive composition of the present invention preferably satisfies the following conditions:

(i) $M_B/M_A$ ranges from 0.01 to 100; and
(ii) $M_C/[M_A+M_B]$ ranges from 0.01 to 100, wherein $M_A$, $M_B$ and $M_C$ are by mole; $M_A$ is the content of hydroxyl groups derived from the hydroxyl-group-containing acrylic polymer (A); $M_B$ is the content of hydroxyl groups derived from the amine compound (B) containing plural hydroxyl groups; and $M_C$ is the content of isocyanate groups derived from the polyisocyanate compound (C).

The present invention also provides, in another aspect, a removable pressure sensitive adhesive sheet including a base material and a removable pressure sensitive adhesive layer which is formed on one or both sides of the base material and includes the removable pressure sensitive adhesive composition. The removable pressure sensitive adhesive sheet preferably has a 180° peel force of less than or equal to 5 N/20-mm with respect to a melamine-faced steel sheet as determined at a rate of pulling of 300 mm/minute, at 23° C. and at 50% relative humidity. When the removable pressure sensitive adhesive sheet is affixed to a melamine-faced steel sheet and is allowed to stand at 50° C. for 48 hours, the sheet preferably has a 180° peel force less than or equal to 1.2 times an initial adhesion (a peel force after adhesion at 23° C. for 20 minutes) as determined at a rate of pulling of 300 mm/minute, at 23° C. and at 50% relative humidity.

The removable pressure sensitive adhesive sheet of the present invention has the aforementioned configuration, can therefore exhibit such tackiness as not to be peeled off from an adherend during adhesion to the adherend and can easily be removed from the adherend without staining the adherend after adhesion. Accordingly, it exhibits satisfactory workability upon removing operation.

For example, when the removable pressure sensitive adhesive sheet of the present invention is affixed to an adherend upon transportation, storage or processing of the adherend, it effectively adheres to the adherend without accidental removing, can protect the adherend and can easily be removed from the adherend with a weak force without causing adhesive deposits after protection of the adherend.

DESCRIPTION OF THE PREFERRED EMBODIMENTS

The removable pressure sensitive adhesive composition of the present invention uses a hydroxyl-group-containing acrylic polymer (A) (hereinafter referred to as "acrylic polymer (A)"), an amine compound (B) having plural hydroxyl groups (hereinafter referred to as "amine compound (B)"), and a polyisocyanate compound (C) (hereinafter referred to as "isocyanate compound (C)"). The acrylic polymer (A) can be used as a base polymer (a base component of the pressure sensitive adhesive), the amine compound (B) can be used as a curing aid (a crosslinking aid), and the isocyanate compound (C) can be used as a curing agent (a crosslinking agent). Specifically, the base polymer, acrylic polymer (A), can be crosslinked and cured, for example, by means of heat during drying by the use of the isocyanate compound (C) as the curing agent and the amine compound (B) as the curing aid. It is important that the removable pressure sensitive adhesive composition of the present invention exhibits a gel fraction of equal to or more than 70% by weight after drying or curing. Specifically, in the removable pressure sensitive adhesive composition of the present invention, the acrylic polymer (A) is to be crosslinked with the use of the isocyanate compound (C) and the amine compound (B) in such a manner that the resulting product exhibits a gel fraction of equal to or more than 70% by weight. Accordingly, when a pressure sensitive adhesive sheet carrying a pressure sensitive adhesive layer comprising the removable pressure sensitive adhesive composition is affixed to an adherend upon its transportation, storage or processing, it can effectively adhere to the adherend without peeling off therefrom. In addition, the pressure sensitive adhesive sheet is suppressed or prevented from increasing in tackiness with time and can easily be removed from the adherend, when required, without causing adhesive deposits on the adherend and without staining the same. The removable pressure sensitive adhesive composition of the present invention can yield a removable pressure sensitive adhesive sheet that can effectively exhibit tackiness when it adheres to an adherend with no or nearly no change in the tackiness with time and can easily be removed from the adherend without causing adhesive deposits on the adherend. Therefore, when the pressure sensitive adhesive composition is used, for example, as a pressure sensitive adhesive of a surface protecting film, it can adhere to an adherend upon transportation, storage or processing of the adherend without peeling off therefrom and can easily be removed after the pressure sensitive adhesive becomes unnecessary after the protection.

Accordingly, the removable pressure sensitive adhesive composition of the present invention is useful as a removable pressure sensitive adhesive composition in pressure sensitive adhesive sheets such as surface protecting films, masking tapes for painting and removable memo pads (e.g., sticky notes).

The removable pressure sensitive adhesive composition of the present invention preferably has a gel fraction of equal to or more than 75% by weight after drying or curing. The gel fraction is not specifically limited in its upper limit and may be less than or equal to 98% by weight and may preferably be less than or equal to 95% by weight. The gel fraction of a dried or cured product of the removable pressure sensitive adhesive composition of the present invention is, for example, from 70% to about 98% by weight, and preferably from about 75% to about 95% by weight. If the gel fraction is less than 70% by weight, the composition may have increased adhesive force and may cause adhesive deposits after removal.

The gel fraction as used herein is determined according to the following procedure. A sample pressure sensitive adhesive (a cured polymer) having a dry weight of $W_1$ (g) is immersed in ethyl acetate at room temperature (e.g., at 20° C.) for three days, is taken out from ethyl acetate and is dried. The weight $W_2$ (g) of the dried pressure sensitive adhesive is determined, and the gel fraction of the pressure sensitive adhesive is then calculated according to the following equation:

Gel fraction (% by weight)=$(W_2/W_1) \times 100$

More specifically, the gel fraction can be determined in the following manner. A solution of the sample pressure sensitive adhesive composition is applied onto a film that has been subjected to release treatment, is dried at 100° C. for 3 minutes, and a fixed amount $W_1$ (g) (about 500 mg) of the resulting pressure sensitive adhesive is sampled. The sampled pressure sensitive adhesive is allowed to stand in ethyl acetate at room temperature for three days, the residual gel is taken out and is dried at 100° C. for 2 hours, and the weight $W_2$ (g) of the gel content is determined. The substitution of the measured values of $W_1$ and $W_2$ into the above equation yields the gel fraction.

The gel fraction of the pressure sensitive adhesive can be controlled, for example, by appropriately selecting the types and ratios of monomers constituting the base polymer of the pressure sensitive adhesive, the type and amount of a polymerization initiator, the reaction temperature, the types and amounts of the crosslinking agent and crosslinking aid, and other polymerization conditions.

The proportion among the acrylic polymer (A), the amine compound (B) and the isocyanate compound (C) in the composition of the present invention may be such proportion as to satisfy the following conditions:

(i) $M_B/M_A$ ranges from 0.01 to 100, preferably from 0.03 to 50, and more preferably from 0.05 to 20; and (ii) $M_C/[M_A+M_B]$ ranges from 0.01 to 100, preferably from 0.03 to 30, and more preferably from 0.1 to 10, wherein $M_A$, $M_B$ and $M_C$ are by mole; $M_A$ is the content of hydroxyl groups derived from the acrylic polymer (A); $M_B$ is the content of hydroxyl groups derived from the amine compound (B); and $M_C$ is the content of isocyanate groups derived from the isocyanate compound (C).

When the proportion among the three components satisfies the above conditions, the acrylic polymer (A) can more effectively be cured, and the pressure sensitive adhesive composition can exhibit more satisfactory cohesion.

Hydroxyl-Group-Containing Acrylic Polymers (A)

The acrylic polymers (A) for use in the present invention are not specifically limited as long as they are acrylic polymers each containing at least one hydroxyl group in its molecule. As the acrylic polymers (A), copolymers comprising at least alkyl esters of (meth)acrylic acid and hydroxyl-group-containing copolymerizable monomers as monomer components can be used. Each of these acrylic polymers (A) can be used alone or in combination.

Such alkyl esters of (meth)acrylic acid are not specifically limited and are preferably alkyl esters of (meth) acrylic acid each containing from 1 to 18 and preferably from 2 to 12 carbon atoms in the alkyl moiety. The alkyl esters of (meth)acrylic acid include, but are not limited to, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, 2-ethylhexyl (meth) acrylate, octyl (meth)acrylate, nonyl (meth)acrylate, isononyl (meth)acrylate, decyl (meth)acrylate, dodecyl (meth)acrylate, and other alkyl esters of (meth)acrylic acid. Each of these alkyl esters of (meth)acrylic acid can be used alone or in combination.

The hydroxyl-group-containing copolymerizable monomers are not specifically limited and include, for example, hydroxymethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and other hydroxyalkyl esters of (meth)acrylic acid, as well as vinyl alcohol; allyl alcohol; 2-hydroxyethyl vinyl ether, 3-hydroxypropyl vinyl ether, 4-hydroxybutyl vinyl ether, and other hydroxyl alkyl vinyl ethers; 2-hydroxyethyl allyl ether, and other hydroxyalkyl allyl ethers; 2-hydroxyethyl crotonate, and other hydroxyalkyl esters of crotonic acid; and methylolated (meth)acrylamide. Each of these hydroxyl-group-containing copolymerizable monomers can be used alone or in combination.

The acrylic polymer (A) may further comprise monomers known as modifying monomers for acrylic pressure sensitive adhesives as monomer components. Such modifying monomers include, but are not limited to, vinyl acetate, vinyl propionate, vinyl butyrate, and other vinyl esters; (meth)acrylonitrile; (meth)acrylamide and other amido-group-containing copolymerizable monomers; glycidyl (meth)acrylate and other epoxy-group-containing copolymerizable monomers; alkyl esters of N,N-dimethylaminoethyl(meth)acrylic acid and other amino-group-containing copolymerizable monomers; (meth)acrylic acid, crotonic acid, itaconic acid, maleic acid, fumaric acid, and other carboxyl-group-containing copolymerizable monomers. Each of these modifying monomers can be used alone or in combination. Among them, carboxyl-group-containing copolymerizable monomers can advantageously be used as the modifying monomers, of which acrylic acid is typically preferred.

The acrylic polymer (A) may further comprise, as monomer components, additional copolymerizable monomers in addition to the aforementioned monomers. Such additional copolymerizable monomers include, but are not limited to, ethylene, propylene, and other olefins and dienes; methoxymethyl (meth)acrylate, 2-methoxyethyl (meth)acrylate, and other alkoxyalkyl esters of (meth)acrylic acid; vinyl chloride, vinylidene chloride, and other halogen-atom-containing vinyl monomers; methyl vinyl ether, ethyl vinyl ether, and other vinyl ethers; styrene, vinyltoluene, and other styrenic monomers.

The acrylic polymer (A) can be prepared according to conventional polymerization processes such as solution polymerization process using a polymerization initiator such as an azo compound or a peroxide; emulsion polymerization process; bulk polymerization process; and polymerization process using a photosensitive initiator and irradiating materials with light or radiant ray. According to the present invention, a radical polymerization process is advantageously employed. In this process, a polymerization initiator that generates a radical upon decomposition is used for the polymerization. In the radical polymerization process, polymerization initiators for use in conventional radical polymerization can be used. Such polymerization initiators include, for example, dibenzoyl peroxide, tert-butyl permaleate, and other peroxides; 2,2'-azobisisobutyronitrile, azobisisovaleronitrile, and other azo compounds.

In the radical polymerization, the amount of the polymerization initiator may be such as to be generally used in polymerization of acrylic monomers and is, for example, from about 0.005 to about 10 parts by weight, and preferably from about 0.1 to 5 parts by weight, relative to 100 parts by weight of the total amount of the monomer components such as the alkyl ester of (meth)acrylic acid and the hydroxyl-group-containing copolymerizable monomer.

When the acrylic polymer (A) for use in the present invention is prepared by the polymerization of the monomer components such as the alkyl ester of (meth)acrylic acid, the hydroxyl-group-containing copolymerizable monomer and modifying monomers, it generally comprises the alkyl ester of (meth)acrylic acid as a major component. The content of the alkyl ester of (meth)acrylic acid in the acrylic polymer (A) is, for example, equal to or more than about 50% by mole (e.g., from about 50% to about 99.9% by mole), preferably equal to or more than about 80% by mole (e.g., from about 80% to about 99.8% by mole), and more preferably equal to or more than about 90% by mole (e.g., from about 90% to about 99.5% by mole), based on the total amount of the monomer components.

The content of the hydroxyl-group-containing copolymerizable monomer in the acrylic polymer (A) is, for example, less than about 20% by weight (e.g., equal to or more than about 0.01% by mole and less than about 20% by mole), preferably less than about 10% by mole (e.g., equal to or more than about 0.02% by mole and less than about 10% by mole), and more preferably less than about 5% by mole (e.g., equal to or more than about 0.05% by mole and less than about 5% by mole), based on the total amount of the monomer components.

The molecular weight (e.g., a weight average molecular weight) of the acrylic polymer (A) is not specifically limited. For example, the weight average molecular weight of the acrylic polymer (A) is equal to or more than about $5 \times 10^4$ (e.g., from about $5 \times 10^4$ to about $300 \times 10^4$), preferably from about $10 \times 10^4$ to about $250 \times 10^4$, and more preferably from about $20 \times 10^4$ to about $200 \times 10^4$.

The composition of the present invention may further comprise an acrylic polymer having a reactive functional group other than hydroxyl group, in addition to the acrylic polymer (A) as the base polymer.

Amine Compounds (B) Containing Plural Hydroxyl Groups

The amine compounds (B) for use in the present invention are not specifically limited as long as they are amine compounds each having at least two hydroxyl groups (alcoholic hydroxyl groups) in its molecule. The number of nitrogen atoms per molecule of such amine compounds (B) is not specifically limited. Each of these amine compounds (B) can be used alone or in combination.

Of these amine compounds (B), examples of amine compounds (B) each having one nitrogen atom in its molecule are diethanolamine, dipropanolamine, diisopropanolamine, N-methyldiethanolamine, N-methyldiisopropanolamine, N-ethyldiethanolamine, N-ethyldiisopropanolamine, N-butyldiethanolamine, N-butyldiisopropanolamine, and other dialcohol-amines; triethanolamine, tripropanolamine, triisopropanolamine, and other trialcohol-amines.

Amine compounds (B) each having two nitrogen atoms in its molecule include amine compounds represented by following Formula (1):

wherein $R^1$, $R^2$, $R^3$ and $R^4$ are the same or different and are each a hydrogen atom or a group: $-(R^5O)_m(R^6O)_n-H$, where $R^5$ and $R^6$ are different and are each an alkylene group; and m and n are each an integer of equal to or more than 0 and are not concurrently 0; where at least two of $R^1$, $R^2$, $R^3$ and $R^4$ are the group: $-(R^5O)_m(R^6O)_n-H$; x is a divalent hydrocarbon group; and p is an integer of equal to or more than 1.

Alkylene groups in $R^5$ and $R^6$ in Formula (1) include, but are not limited to, methylene, ethylene, propylene, trimethylene, tetramethylene, ethylethylene, pentamethylene, hexamethylene, and other alkylene groups each containing from about 1 to about 6 carbon atoms. Among them, alkylene groups each containing from 1 to 4 carbon atoms are preferred, of which alkylene groups each containing 2 or 3 carbon atoms are typically preferred. These alkylene groups may be straight-chain or branched-chain alkylene groups. As the alkylene groups in $R^5$ and $R^6$, ethylene group and propylene group are preferred.

The repetition numbers m and n are not specifically limited as long as they are integers equal to or more than 0. For example, at least one of m and n may range from about 0 to about 20, and preferably from about 1 to about 10. In many cases, one of m and n is 0 and the other is an integer of equal to or more than 1 (specifically 1). The repetition numbers m and n are not concurrently 0. If m and n are concurrently 0, such substituents $R^1$, $R^2$, $R^3$ and $R^4$ represent hydrogen atoms.

The group x is a divalent hydrocarbon group. Such divalent hydrocarbon groups include, for example, alkylene groups, cycloalkylene groups and arylene groups. The alkylene groups as x may be saturated or unsaturated straight-or branched-chain alkylene groups. Such alkylene groups as x include, but are not limited to, methylene, ethylene, propylene, trimethylene, tetramethylene, and other alkylene groups each containing from about 1 to about 6 carbon atoms. Among them, alkylene groups each containing from 1 to 4 carbon atoms are preferred, of which alkylene groups each containing 2 or 3 carbon atoms are typically preferred. The cycloalkylene groups include, but are not limited to, 1,2-cyclohexylene group, 1,3-cyclohexylene group, 1,4-cyclohexylene group, and other cycloalkylene groups each containing from about 5 to about 12 members in its ring. The arylene groups include, but are not limited to, 1,2-phenylene group, 1,3-phenylene group and 1,4-phenylene group.

The repetition number p is not specifically limited as long as it is an integer of equal to or more than 1. The repetition number p is, for example, an integer from 1 to about 10, preferably an integer from 1 to 6, and more preferably an integer from 1 to 4.

More specifically, examples of the amine compounds (B) represented by Formula (1) are N,N,N',N'-tetrakis(2-hydroxyethyl)ethylenediamine, N,N,N',N'-tetrakis(2-hydroxypropyl)ethylenediamine, N,N,N',N'-tetrakis(2-hydroxyethyl)trimethylenediamine, N,N,N',N'-tetrakis(2-hydroxypropyl)trimethylenediamine, as well as polyoxyethylene condensates of ethylenediamine, polyoxypropylene condensates of ethylenediamine, polyoxyethylene-polyoxypropylene condensates of ethylenediamine, and other polyoxyalkylene condensates of alkylenediamines. Such amine compounds (B) are commercially available, for example, from Asahi Denka Kogyo K.K. under the trade names of EDP-300, EDP-450, EDP-1100 and Pluronic.

The composition of the present invention may further comprise additional amine compounds each having plural reactive functional groups other than hydroxyl groups, in addition to the amine compounds (B).

Polyisocyanate Compounds (C)

The isocyanate compounds (C) for use in the present invention are not specifically limited as long as they each contain at least two isocyanate groups in its molecule. Such isocyanate compounds (C) include, for example, aliphatic polyisocyanates, alicyclic polyisocyanates, aromatic polyisocyanates and aromatic-aliphatic polyisocyanates. Each of these isocyanate compounds (C) can be used alone or in combination.

The aliphatic polyisocyanates include, but are not limited to, 1,6-hexamethylene diisocyanate, 1,4-tetramethylene diisocyanate, 2-methyl-1,5-pentane diisocyanate, 3-methyl-1,5-pentane diisocyanate, lysine diisocyanate, and other aliphatic diisocyanates.

The alicyclic polyisocyanates include, but are not limited to, isophorone diisocyanate, cyclohexyl diisocyanate, hydrogenated tolylene diisocyanate, hydrogenated xylene diisocyanate, hydrogenated diphenylmethane diisocyanate, hydrogenated tetramethylxylene diisocyanate, and other alicyclic diisocyanates.

The aromatic polyisocyanates include, but are not limited to, 2,4-tolylene diisocyanate, 2,6-tolylene diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, and other aromatic diisocyanates.

The aromatic-aliphatic polyisocyanates include, but are not limited to, xylylene-1,4-diisocyanate, xylylene-1,3-diisocyanate, and other aromatic-aliphatic diisocyanates.

The isocyanate compounds (C) also include dimers, trimers, reaction products or polymers of the aforementioned aliphatic polyisocyanates, alicyclic polyisocyanates, aromatic polyisocyanates and aromatic-aliphatic polyisocyanates. Such compounds include, for example, dimers or trimers of diphenylmethane diisocyanate; reaction products between trimethylolpropane and tolylene diisocyanate; reaction products between trimethylolpropane and hexamethylene diisocyanate; polymethylene polyphenylisocyanates, polyether polyisocyanates, and polyester polyisocyanates.

The composition may further comprise additional crosslinking agents in addition to the polyisocyanate compounds (C). Such additional crosslinking agents include, for example, polyfunctional melamine compounds and polyfunctional epoxy compounds.

The pressure sensitive adhesive composition of the present invention may be used as intact or may further include additives according to necessity. For example, the composition may comprise known or conventional tackifier resins in order to control adhesion characteristics. Such tackifier resins include, but are not limited to, rosin resins, terpene resins, petroleum resins, coumarone-indene resins, styrenic resins, and phenolic resins. In addition, the composition may comprise conventional additives other than tackifier resins such as plasticizers, finely powdered silica and other fillers, coloring agents, ultraviolet absorbents, antioxidants and other stabilizers. The amounts of these additives may be amounts for general use in acrylic pressure sensitive adhesives.

The removable pressure sensitive adhesive according to the present invention comprises the removable pressure sensitive adhesive composition mainly containing the acrylic polymer (A) and further including the amine compound (B) and the isocyanate compound (C). The removable pressure sensitive adhesive can yield a removable pressure sensitive adhesive layer (a pressure sensitive adhesive layer) by crosslinking the acrylic polymer (A) by means of heating or another drying procedure.

The removable pressure sensitive adhesive sheet of the present invention has only to include such a removable pressure sensitive adhesive layer comprising the removable pressure sensitive adhesive and may be whichever of a removable pressure sensitive adhesive sheet with substrate comprising a base material (a substrate) and the removable pressure sensitive adhesive layer formed at least on one side of the substrate, and a substrate-less removable pressure sensitive adhesive sheet comprising the pressure sensitive adhesive layer alone and including no substrate. To protect the removable pressure sensitive adhesive layer, a release film (a release liner) may be laminated on the pressure sensitive adhesive layer until the time when the sheet is used. The shape of the removable pressure sensitive adhesive sheet is not specifically limited and may be any appropriate shape such as a sheet or a tape.

The thickness of the removable pressure sensitive adhesive layer is not specifically limited and can appropriately be selected within ranges, for example, from about 5 to about 300 μm, and preferably from about 10 to about 100 μm depending on its application.

Base materials (substrates) for use in the removable pressure sensitive adhesive sheet with substrate include conventional substrates generally used in pressure sensitive adhesive sheets. Such substrates include, but are not limited to, plastic films made of plastics such as polyethylenes and other polyolefin resins, poly(ethylene terephthalate) and other polyester resins, vinyl chloride resins, vinyl acetate resins, polyimide resins, fluorocarbon resins and cellophane; kraft paper, Japanese paper and other paper; single or mixed woven or nonwoven fabrics and other fabrics made of fibrous substances such as Manila hemp, pulp, rayon, acetate fibers, polyester fibers, poly(vinyl alcohol) fibers, polyamide fibers, polyolefin fibers, and other natural fibers, semisynthetic fibers or synthetic fibers; rubber sheets made of rubber such as natural rubber and butyl rubber; foam sheets made of foams such as polyurethane foam and polychloroprene rubber foam; metal foil such as aluminium foil and copper foil; and composites of these materials. As the base material, polyethylene films, polyester films (e.g., poly(ethylene terephthalate) films) and other plastic films are preferred. The base material may be transparent, translucent or opaque. One or both sides of the base material may have been subjected to surface treatment such as corona treatment.

The thickness of the base material may appropriately be set within ranges not adversely affecting handling property and other properties of the pressure sensitive adhesive sheet and is generally from about 10 to about 500 μm, and preferably from about 20 to about 200 μm.

The removable pressure sensitive adhesive sheet with substrate can be prepared by applying the removable pressure sensitive adhesive composition of the present invention at least on one side of the base material, and drying, crosslinking and thereby curing the pressure sensitive adhesive.

The substrate-less removable pressure sensitive adhesive sheet can be prepared by applying the removable pressure sensitive adhesive composition of the present invention on a release liner composed of a substrate such as a plastic film (e.g., a poly(ethylene terephthalate) film) having a release layer, and drying, crosslinking and thereby curing the pressure sensitive adhesive. In the release liner, the removable pressure sensitive adhesive composition is applied onto a side on which the release layer is formed. The release layer can be formed on one or both sides of the substrate in the release liner.

Substrates for use in the release liner are preferably plastic films but also include paper, foams and metal foil. The thickness of the substrate of the release liner can appropriately be set depending on its object and is generally from about 10 to about 500 μm. Materials for such plastic films constituting the substrate of the release liner include, for example, poly(ethylene terephthalate) and other polyesters, polypropylenes, ethylene-propylene copolymers and other polyolefins, poly(vinyl chloride), and other thermoplastic resins. Such plastic films may be whichever of non-stretched films and stretched (uniaxially stretched or biaxially stretched) films.

As the release layer, release layers (e.g., silicone release layers) used as release layers in conventional release liners can be used.

The removable pressure sensitive adhesive composition can be applied by the use of conventional coaters such as gravure roller coater, reverse-roll coater, kiss contact roller coater, dip-roll coater, bar coater, knife coater and spray coater.

The removable pressure sensitive adhesive layer may comprise plural layers with or without the interposition of another layer within ranges not deteriorating the advantages of the present invention. For example, the removable pressure sensitive adhesive sheet may be a double-sided pressure sensitive adhesive sheet comprising a transparent substrate and removable pressure sensitive adhesive layers of the removable pressure sensitive adhesive composition of the present invention formed on both sides of the substrate.

The removable pressure sensitive adhesive sheet of the present invention can be used as a removable pressure sensitive adhesive tape by cutting the sheet to an appropriate width and winding the cut sheet as a roll.

The removable pressure sensitive adhesive sheet of the present invention has a 180° peel force with respect of a melamine-faced steel sheet of, for example, less than or equal to 5 N/20-mm (e.g., from 1 to 5 N/20-mm), preferably less than or equal to 3 N/20-mm (e.g., from 1.2 to 3 N/20-mm), and more preferably less than or equal to 2.5 N/20-mm (e.g., from 1.5 to 2.5 N/20-mm).

When the removable pressure sensitive adhesive sheet is affixed to a melamine-faced steel sheet and is allowed to stand at 50° C. for 48 hours, it preferably has a 180° peel force with respect to the melamine-faced steel sheet less than or equal to 1.2 times (e.g., from 1 to 1.2 times), more preferably from 1 to 1.15 times, and typically preferably from 1 to 1.1 times the initial adhesion (a peel force after adhesion at 23° C. for 20 minutes), as determined at a rate of pulling of 300 mm/minute, at 23° C. and at 50% relative humidity.

The tackiness or adhesion (peel force) can be controlled, for example, by appropriately selecting the types and proportions of monomer components constituting the base polymer of the removable pressure sensitive adhesive, the type and amount of the polymerization initiator, the temperature and time period of polymerization, and the types and amounts of the crosslinking agent and crosslinking aid.

The removable pressure sensitive adhesive sheet of the present invention can effectively exhibit tackiness during adhesion to an adherend, can easily be removed from the adherend without adhesive deposits on the adherend and can therefore widely be applied to manufacture and processing of various articles and members, removal of foreign matters, surface protection of members, and masking in, for example, production equipment. More specifically, the removal pressure sensitive adhesive sheet of the present invention can be used, for example, as surface protecting films, masking tapes for painting and removable memo pads such as sticky notes.

EXAMPLES

The present invention will be illustrated in further detail with reference to several examples and comparative examples below, which are not intended to limit the scope of the invention. All parts and percentages are by weight unless otherwise specified.

Example 1

To 100 parts of a compound containing n-butyl acrylate, ethyl acrylate and 4-hydroxybutyl acrylate (50:46:4, by weight) was added 0.2 part of 2,2'-azobisisobutyronitrile as a polymerization initiator, followed by polymerization in toluene, and thereby yielded a solution (a copolymer solution) containing an acrylic polymer (a copolymer) having a weight average molecular weight of 560000 in terms of polystyrene as determined by gel permeation chromatography (GPC). To 100 parts of solid contents of the copolymer in the copolymer solution were added and sufficiently mixed 1.5 parts of "EDP-1100" (trade name of a product available from Asahi Denka Kogyo K.K.; a polyoxypropylene condensate of ethylenediamine as an amine compound having plural hydroxyl groups) and 4 parts of "Collonate L" (trade name of a polyisocyanate compound available from Nippon Polyurethane Industry Co., Ltd.) and thereby yielded a pressure sensitive adhesive composition. The prepared pressure sensitive adhesive composition was applied to a polyethylene film 60 μm thick in such an amount that the dried thickness of the resulting pressure sensitive adhesive layer was 10 μm, was dried at 100° C. for 3 minutes and thereby yielded a pressure sensitive adhesive tape.

Example 2

A pressure sensitive adhesive tape was prepared in the same manner as in Example 1, except that the amounts of "EDP-1100" (trade name) as the amine compound having plural hydroxyl groups and of "Collonate L" (trade name) as the polyisocyanate compound were changed to 3 parts each.

Example 3

To 100 parts of a compound containing n-butyl acrylate, ethyl acrylate and 4-hydroxybutyl acrylate (50:49:1, by weight) was added 0.2 part of 2,2'-azobisisobutyronitrile as a polymerization initiator, followed by polymerization in toluene, and thereby yielded a solution (a copolymer solution) containing an acrylic polymer (a copolymer) having a weight average molecular weight of 520000 in terms of polystyrene as determined by gel permeation chromatography (GPC). To 100 parts of solid contents of the copolymer in the copolymer solution were added and sufficiently mixed 1.5 parts of "EDP-450" (trade name of an amine compound having plural hydroxyl groups available from Asahi Denka Kogyo K.K.) and 5 parts of "Collonate L" (trade name of a polyisocyanate compound available from Nippon Polyurethane Industry Co., Ltd.) and thereby yielded a pressure sensitive adhesive composition. The prepared pressure sensitive adhesive composition was applied to a polyethylene film 60 μm thick in such an amount that the dried thickness of the resulting pressure sensitive adhesive layer was 10 μm. The applied composition was then dried at 100° C. for 3 minutes and thereby yielded a pressure sensitive adhesive tape.

Example 4

A pressure sensitive adhesive tape was prepared in the same manner as in Example 3, except that the amount of "EDP-450" (trade name) as the amine compound containing plural hydroxyl groups was changed to 0.5 part.

Comparative Example 1

A pressure sensitive adhesive tape was prepared in the same manner as in Example 1, except that "EDP-1100" (trade name) as the amine compound containing plural hydroxyl groups was not used. In other words, an amine compound containing plural hydroxyl groups as the crosslinking aid was not used in Comparative Example 1.

Comparative Example 2

To 100 parts of a compound containing n-butyl acrylate and ethyl acrylate (50:50, by weight) was added 0.2 part of 2,2'-azobisisobutyronitrile as a polymerization initiator, followed by polymerization in toluene, and thereby yielded a solution (a copolymer solution) containing an acrylic polymer (a copolymer) having a weight average molecular weight of 480000 in terms of polystyrene as determined by GPC. A pressure sensitive adhesive tape was prepared in the same manner as in Example 1, except that the above-prepared acrylic polymer was used. In other words, the acrylic polymer used in Comparative Example 2 contained no hydroxyl group.

Comparative Example 3

To 100 parts of a compound containing n-butyl acrylate, ethyl acrylate and acrylic acid (50:46:4, by weight) was added 0.2 part of 2,2'-azobisisobutyronitrile as a polymerization initiator, followed by polymerization in toluene, and thereby yielded a solution (a copolymer solution) containing an acrylic polymer (a copolymer) having a weight average molecular weight of 530000 in terms of polystyrene as determined by GPC. A pressure sensitive adhesive tape was prepared in the same manner as in Example 1, except that the above-prepared acrylic polymer was used. In other words, the acrylic polymer used in Comparative Example 3 contained no hydroxyl group and included a carboxyl group.

Comparative Example 4

To 100 parts of a compound containing n-butyl acrylate, ethyl acrylate and 4-hydroxybutyl acrylate (50:49.9:0.1, by weight) was added 0.2 part of 2,2'-azobisisobutyronitrile as a polymerization initiator, followed by polymerization in toluene, and thereby yielded a solution (a copolymer solution) containing an acrylic polymer (a copolymer) having a weight average molecular weight of 490000 in terms of polystyrene as determined by gel permeation chromatography (GPC). To 100 parts of solid contents of the copolymer in the copolymer solution were added and sufficiently mixed 0.1 part of "EDP-1100" (trade name of an amine compound having plural hydroxyl groups available from Asahi Denka Kogyo K.K.) and 4 parts of "Collonate L" (trade name of a polyisocyanate compound available from Nippon Polyurethane Industry Co., Ltd.) and thereby yielded a pressure sensitive adhesive composition. Using the prepared pressure sensitive adhesive composition, a pressure sensitive adhesive tape was prepared in the same manner as in Example 1. The gel fraction of a cured product of the pressure sensitive adhesive composition obtained in Comparative Example 4 was less than 70% by weight as shown in Table 1.

Determination

The pressure sensitive adhesive tapes obtained in the examples and comparative examples were allowed to stand under predetermined conditions (at 23° C. for 1 day or at 23° C. for 14 days), and the adhesive strength and gel fraction of the resulting pressure sensitive adhesive tapes were determined according to the following methods (tackiness measuring method and gel fraction measuring method). The results are shown in Table 1.

Tackiness Measuring Method

A sample pressure sensitive adhesive tape 20 mm wide 100 mm long was brought into contact bonding with a melamine-faced steel sheet by the reciprocating motion of a 2-kg roller and was allowed to stand under the following standing condition. Thereafter, the force to remove the tape from the adherend (180° peel force; g/20-mm) was determined as the tackiness according to a 180° peel test at a rate of pulling of 300 mm/minute, at 23° C. and at 50% relative humidity. In Table 1, the symbol "*" means that the pressure sensitive adhesive tape could not be removed from the adherend, indicating that the pressure sensitive adhesive layer was so firmly bonded to the adherend as not to be peeled off therefrom.

Standing condition: At 23° C. for 20 minutes, at 23° C. for 48 hours, or at 50° C. for 48 hours Gel Fraction Measuring Method A sample pressure sensitive adhesive having a weight of $W_1$ (about 500 mg) was immersed in ethyl acetate at room temperature for 3 days, was taken out from ethyl acetate, and was dried at 100° C. for 2 hours. The weight $W_2$ of the dried pressure sensitive adhesive was determined, and the gel fraction of the pressure sensitive adhesive was calculated according to the following equation:

Gel fraction=$(W_2/W_1) \times 100$ (% by weight)

In Table 1, $M_A$, $M_B$ and $M_C$ are by mole; $M_A$ is the content of hydroxyl groups derived from the acrylic polymer; $M_B$ is the content of hydroxyl groups derived from the amine compound containing plural hydroxyl groups; and $M_C$ is the content of isocyanate groups derived from the polyisocyanate compound.

as not to be peeled off from the adherends. In addition, the pressure sensitive adhesive tapes can keep their appropriate tackiness over a long time and can easily be removed from the adherends after adhesion.

Other embodiments and variations will be obvious to those skilled in the art, and this invention is not to be limited to the specific matters stated above.

What is claimed is:

1. A removable pressure sensitive adhesive composition comprising at least:
   (A) a hydroxyl-group-containing acrylic polymer as a base polymer, in which the content of the hydroxyl-group-containing copolymerizable monomer is equal to or greater than 0.01 mole % and less than 20 mole % based on the total amount of monomer components;
   (B) an amine compound containing plural hydroxyl groups as a curing aid, said amine compound being represented by formula (1)

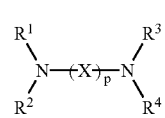

wherein:
   $R^1$, $R^2$, $R^3$, and $R^4$ are the same or different and each is a hydrogen atom or a group of the formula—$(R^5O)_m$ $(R^6O)_n$—H in which $R^5$ and $R^6$ are different from one another and each is an alkylene group and each of m and n is an integer of equal to or more than 0, provided that m and n are not concurrently 0 and provided that at least two of $R^1$, $R^2$, $R^3$, and $R^4$ are a group of the formula—$(R^5O)_m(R^6O)_n$—H;
   X is a divalent hydrocarbon group; and
   p is an integer of equal to or more than 1; and
   (C) a polyisocyanate compound as a curing agent, wherein a dried or cured product of the composition has a gel fraction of equal to or more than 70% by weight, wherein the composition satisfies the following conditions:

TABLE 1

|  |  |  | Example | | | | Comparative Example | | | |
|---|---|---|---|---|---|---|---|---|---|---|
|  |  |  | 1 | 2 | 3 | 4 | 1 | 2 | 3 | 4 |
| $M_B/M_A$ | | | 0.20 | 0.39 | 1.92 | 0.07 | 0.00 | — | — | 1.91 |
| $M_C/[M_B + M_A]$ | | | 0.50 | 0.32 | 1.03 | 0.57 | 0.60 | 3.07 | 3.07 | 158 |
| 23° C. × 1 day | Gel fraction (wt. %) | | 91 | 83 | 79 | 86 | 42 | 0 | 37 | 32 |
| | Tackiness (N/20-mm) | 23° C. × 28 min | 1.8 | 2.2 | 2.4 | 2.0 | 3.5 | * | 3.2 | 3.6 |
| | | 23° C. × 48 hr | 1.8 | 2.2 | 2.4 | 2.1 | 3.9 | * | 5.1 | 4.2 |
| | | 50° C. × 48 hr | 1.8 | 2.3 | 2.4 | 2.1 | 4.6 | * | 6.8 | 5.1 |
| 23° C. × 14 days | Gel fraction (wt. %) | | 92 | 85 | 82 | 88 | 75 | 3 | 65 | 58 |
| | Tackiness (N/20-mm) | 23° C. × 20 min | 1.7 | 2.2 | 2.3 | 2.1 | 2.4 | * | 2.8 | 3.3 |
| | | 23° C. × 48 hr | 1.8 | 2.2 | 2.4 | 2.1 | 2.6 | * | 4.5 | 3.9 |
| | | 50° C. × 48 hr | 1.8 | 2.2 | 2.4 | 2.1 | 3.0 | * | 6.3 | 4.7 |

Table 1 indicates that the pressure sensitive adhesive tapes according to Examples 1 through 4 each comprise a pressure sensitive adhesive containing the acrylic polymer (A), the amine compound (B) and the isocyanate compound (C) and having a gel fraction of equal to or more than 70% by weight and therefore exhibit such appropriate tackiness (adhesion)

(i) $M_B/M_A$ ranges from 0.01 to 100; and (II) $M_C/[M_A+M_B]$ ranges from 0.01 to 100, in which conditions $M_A$, $M_B$ and $M_C$ are molar values, with: $M_A$ being the content of hydroxyl groups derived from the hydroxyl-group-containing acrylic polymer (A); $M_B$ being the content of hydroxyl groups derived from the amine compound (B) containing plural hydroxyl groups; and $M_C$ being the content of isocyanate groups derived from the polyisocyanate compound (C).

2. The composition of claim 1, wherein a dried or cured product of the composition has a gel fraction of from 75% by weight to 95% by weight.

3. The composition of claim 1, in which $M_B/M_A$ is 0.20 and $M_C/[M_A+M_B]$ is 0.50.

4. The composition of claim 1, in which:
(A) is an acrylic copolymer of n-butyl acrylate, vinyl acetate, and 4-hydroxybutyl acrylate in a weight ratio of 50:46:4; and (B) is a polyoxypropylene condensate of ethylene diamine.

5. The composition of claim 4, wherein a dried or cured product of said composition has a gel fraction of 91% by weight.

6. A removable pressure sensitive adhesive sheet comprising: a base material; and a removable pressure sensitive adhesive layer being formed at least on one side of the base material and comprising the removable pressure sensitive adhesive composition as claimed in claim 1.

7. The sheet according to claim 6, wherein the sheet has a 180° peel force of equal to or more than 5N/20-mm with respect to a melamine-faced steel sheet as determined at a rate of pulling of 300 mm/minute, at 23° C. and at 50% relative humidity.

8. The sheet according to claim 7 wherein, when the sheet is affixed to a melamine-faced steel sheet and is allowed to stand at 50° C. for 48 hours, the sheet has a 180° peel force less than or equal to 1.2 times an initial adhesion (a peel force after adhesion at 23° C. for 20 minutes) as determined at a rate of pulling of 300 mm/minute, at 23° C. and at 50% relative humidity.

* * * * *